United States Patent
Ohkubo

[19]

[11] Patent Number: 5,857,934
[45] Date of Patent: Jan. 12, 1999

[54] AUTOMATIC TRANSMISSION APPARATUS WITH TORQUE CONVERTOR PLANETARY GEAR MECHANISM

[75] Inventor: Masahiro Ohkubo, Neyagawa, Japan

[73] Assignee: EXEDY Corporation, Neyagawa, Japan

[21] Appl. No.: 888,809

[22] Filed: Jul. 7, 1997

[30] Foreign Application Priority Data

Jul. 11, 1996 [JP] Japan ................................. 8-181794

[51] Int. Cl.$^6$ ................................................ F16H 47/08
[52] U.S. Cl. ............................. 475/44; 475/36; 475/41
[58] Field of Search ................................. 475/35, 36, 41, 475/44, 47, 53, 329, 294, 275, 276, 277, 278, 279

[56] References Cited

U.S. PATENT DOCUMENTS

| | | | |
|---|---|---|---|
| 2,839,951 | 6/1958 | Winther | 475/41 |
| 2,851,906 | 9/1958 | DeLorean | 475/44 |
| 4,869,128 | 9/1989 | Ohkubo . | |
| 4,942,779 | 7/1990 | Ohkubo | 475/39 |
| 5,122,104 | 6/1992 | Ohkubo | 475/291 |

FOREIGN PATENT DOCUMENTS

| | | | |
|---|---|---|---|
| 593048 | 4/1994 | European Pat. Off. | 475/36 |
| 22 21 713 | 11/1973 | Germany . | |
| 4-73018 | 11/1992 | Japan . | |
| 6-89834 | 11/1994 | Japan . | |

Primary Examiner—Richard M. Lorence
Assistant Examiner—Sherry Lynn Estremsky
Attorney, Agent, or Firm—Shinjyu An Intellectual Property Firm

[57] ABSTRACT

An automatic transmission apparatus has a transmission 3 having first and second input shafts 31 and 32 as well as a clutch or a brake, and also has a torque converter 2 having a main unit 10, a planetary gear train 11, lock-up clutch device 12 and a one-way clutch 35. The planetary gear train 11 has a ring gear r1 coupled to a turbine 16, planetary gears p1 meshing with the ring gear r1, a carrier 20 coupled to the first input shaft 31 of the transmission 3 and carrying the planetary gears p1, and a sun gear s1 coupled to a stator 17 and meshing with the planetary gears p1. The one-way clutch 35 transmits a power to the second input shaft 32 of the transmission 3 only when the stator 17 rotates reversely to the impeller 15 and turbine 16.

15 Claims, 10 Drawing Sheets

| SPEED | MODE | GEAR RATIO | |
|---|---|---|---|
| | | TURBINE | STATOR |
| 1st | OWC | $A_1 \dfrac{ZaO + ZrO}{ZrO} + D_1 \dfrac{ZaO}{ZrO}$ | $-D_1$ |
| | L/U | $A_1$ | ----- |
| 2nd | OWC | $A_2 \dfrac{ZaO + ZrO}{ZrO}$ | ----- |
| | L/U | $A_2$ | ----- |
| 3rd | OWC / L/U | 1 | ----- |
| 4th | OWC | $-D_4 \dfrac{ZaO}{ZrO}$ | $D_4$ |

$Za0=20$ $Zr0=56$ $Za1=21$ $Zr1=87$ $Za2=36$
$Zr2=72$

| STATE | SHIFT | MODE | GEAR RATIOS | |
|---|---|---|---|---|
| | | | TURBINE | STATOR |
| 1st | 1st | $B_3$OWC | 4.939 | -2.429 |
| | 2nd | $B_3$L/U | 3.000 | ----- |
| 2nd | 3rd | $B_1$OWC | 2.148 | ----- |
| | 4th | $B_1$L/U | 1.583 | ----- |
| 3rd | 5th | $C_1$(L/U) | 1.000 | ----- |
| 1st | Rev | $B_2$OWC | -3.760 | 5.143 |

ZaO=20  ZrO=56  Za1=Za2=33  Zr1=Zr2=72

| STATE | SHIFT | MODE | GEAR RATIOS | |
|---|---|---|---|---|
| | | | TURBINE | STATOR |
| 1st | 1st | $B_3$OWC | 4.115 | -2.187 |
| | 2nd | $B_3$L/U | 2.458 | ----- |
| 2nd | 3rd | $B_1$OWC | 1.978 | ----- |
| | 4th | $B_1$L/U | 1.458 | ----- |
| 3rd | 5th | $C_1$(L/U) | 1.000 | ----- |
| 4th | Rev | $B_2$OWC | -1.136 | 3.182 |

$Za0=20$  $Zr0=56$  $Za1=34$  $Zr1=74$  $Za2=29$

| STATE | SHIFT | MODE | GEAR RATIOS | |
|---|---|---|---|---|
| | | | TURBINE | STATOR |
| 1st | 1st | $B_3$OWC | 4.374 | -2.176 |
| | 2nd | $B_3$L/U | 2.552 | ----- |
| 2nd | 3rd | $B_1$OWC | 2.020 | ----- |
| | 4th | $B_1$L/U | 1.489 | ----- |
| 3rd | 5th | $C_1$(L/U) | 1.000 | ----- |
| 4th | Rev | $B_2$OWC | -1.088 | 3.047 |

| STATE | SHIFT | MODE | GEAR RATIOS ||
| | | | TURBINE | STATOR |
| --- | --- | --- | --- | --- |
| 1st | 1st | $B_3$OWC | 4.939 | -2.429 |
| | 2nd | $B_3$L/U | 3.000 | ----- |
| 2nd | 3rd | $B_1$OWC | 2.148 | ----- |
| | 4th | $B_1$L/U | 1.583 | ----- |
| 3rd | 5th | $C_1$(L/U) | 1.000 | ----- |
| 4th | Rev | $B_2$OWC | -0.969 | 2.714 |

$Za0=20$  $Zr0=56$  $Za1=21$  $Zr1=72$  $Za2=36$

Za0=20 Zr0=56 Za1=36 Zr1=75 Za2=42
Zr2=75

| STATE | SHIFT | MODE | GEAR RATIOS | |
|---|---|---|---|---|
| | | | TURBINE | STATOR |
| 1st | 1st | $B_3$OWC | 4.525 | -2.083 |
| | 2nd | $B_3$L/U | 2.786 | ----- |
| 2nd | 3rd | $B_1$OWC | 2.143 | ----- |
| | 4th | $B_1$L/U | 1.579 | ----- |
| 3rd | 5th | $C_1$(L/U) | 1.000 | ----- |
| 4th | Rev | $B_2$OWC | -0.974 | 2.726 |

FIG.16

$Z4=98$    $Zro=56$   $ZR1=50$   $ZR2=56$   $ZR3=50$
           $ZaO=20$   $Zt1=72$           $Zt3=72$
                 $Z1=30$   $Z2=76$   $Z3=30$

| STATE | SHIFT | MODE | GEAR RATIOS | |
|---|---|---|---|---|
| | | | TURBINE | STATOR |
| 1st | 1st | $C_3OWC$ | 5.598 | -3.266 |
| | 2nd | $C_3L/U$ | 3.226 | ----- |
| 1st | 3rd | $C_2OWC$ | 1.959 | -1.444 |
| | 4th | $C_2L/U$ | 1.444 | ----- |
| 1st | R1 | $C_1OWC$ | -5.598 | -3.266 |
| | (R2) | $C_1L/U$ | -3.266 | ----- |

FIG.18

$Z4=60$   $Zro=56$
        $ZaO=20$   $Z1=32$   $Z2=28$   $Z3=30$

| STATE | SHIFT | MODE | GEAR RATIOS | |
|---|---|---|---|---|
| | | | TURBINE | STATOR |
| 1st | FL | $C_1OWC$ | 3.00 | -1.75 |
| | F2 | $C_1L/U$ | 1.75 | ----- |
| 1st | R1 | $C_2OWC$ | -3.00 | 1.75 |
| | (R2) | $C_2L/U$ | -1.75 | ----- |

AUTOMATIC TRANSMISSION APPARATUS WITH TORQUE CONVERTOR PLANETARY GEAR MECHANISM

BACKGROUND OF THE INVENTION

A. Field of the Invention

The present invention relates to an automatic transmission apparatus including a torque converter which has a multi-speed configuration.

B. Description of the Background Art

The assignee of the present application has previously proposed various kinds of structures for automatic transmission apparatuses, in which a four-element torque converter is used with automatic transmissions. In the four element torque converter, the four elements include a turbine, a first stator, a second stator and an impeller. The turbine and at least one of the two stators are coupled to portions of the transmission to produce an output by combining torque transmitted from them. These automatic transmission apparatuses can be classified into the following three types.

According to a first type of an automatic transmission apparatus, which is disclosed in Japanese Patent No. 1,965,369 (Japanese Patent Application Number 60-25906), and U.S. Pat. No. 5,122,104, forward rotation power of a turbine and reverse rotation power of a stator are output from a torque converter when a 1st (forward 1st) speed and a reverse are selected. When a 2nd speed is selected, the stator is fixed and the rotation power is transmitted only from the turbine. When a 3rd speed is selected, the turbine is integrated with the stator. U.S. Pat. No. 5,122,104 is herein incorporated by reference.

A second type of an automatic transmission apparatus, is disclosed in Japanese Patent Nos. 1,871,294, 1,896,991, 1,896,992 and 1,963,199, which correspond to Japanese Patent Application Numbers 61-101504, 61-101505, 62-101506 and 61-101446, respectively. Japanese Patent Application Numbers 61-101504, 61-101505, 62-101506 and 61-101446 were combined and subsequently issued as U.S. Pat. Nos. 4,869,128 and 4,942,779. U.S. Pat. Nos. 4,869,128 and 4,942,779 are both incorporated herein by reference. The second type of an automatic transmission apparatus disclosed in U.S. Pat. Nos. 4,869,128 and 4,942,779. U.S. Pat. Nos. 4,869,128 and 4,942,779 differs from that disclosed in U.S. Pat. No. 5,122,104 in that the reverse driving is performed by fixing the turbine and supplying the rotation power from the stator.

A third type of transmission and torque converter is disclosed in Japanese Patent Nos. 1,785,235 (Application No. 59-195410) and 1,962,867 (Application No. 60-7233). In the third type, the forward rotation power of the turbine and the reverse rotation power of the stator are transmitted at all speed settings of the transmission. The disclosures of Japanese Patent Nos. 1,785,235 and 1,962,867 are herein incorporated by reference.

According to these types of automatic transmission apparatuses, the rotation power can be supplied also from one of the stators in contrast to a general transmission apparatus utilizing only an output of the turbine. Therefore, in the above described transmissions, the power output can be relatively large.

The assignee of the present application has also proposed another novel structure in Japanese Patent Application No. 7-234386 (1995). In this structure, a turbine of a torque converter is coupled to a first output shaft via a planetary gear train, and a stator is coupled to a second output shaft via a one-way clutch. Further, another one-way clutch is arranged between a sun gear of the planetary gear train and the second output shaft, and a reverse rotation power of the sun gear is transmitted to the second output shaft via this one-way clutch.

According to this structure, the transmission can output a further larger power compared with the first and third types, and the number of speeds can be increased.

However, the above structure disclosed in Japanese Patent Application No. 7-234386 suffers from such a problem that an engine brake cannot function during reverse driving in 1st and 3rd speeds when the sun gear reversely rotates faster than the second output shaft, because the one-way clutch is arranged between the sun gear of the planetary gear train and the second output shaft. Further, it suffers from complicated structures, increase in weight and size and increase in manufacturing cost, because two one-way clutches are arranged in the torque converter.

SUMMARY OF THE INVENTION

An object of the invention is to provide an automatic transmission apparatus overcoming the above problems, and more specifically an automatic transmission apparatus which allows utilization of engine brake during driving in all forward speeds.

Another object of the invention is to provide an automatic transmission apparatus, which has a simple, light and compact structure, and can be manufactured at a low cost.

Still another object of the invention is to provide a structure which can be employed, for example, in the foregoing automatic transmission apparatus and has transmission characteristics suitable, e.g., for off-road vehicles and more specifically the transmission characteristics allowing change in gear ratio in geometric progression in accordance with change in selected speed or gear position.

In accordance with a first aspect of the invention, an automatic transmission apparatus for outputting a power of an engine selectively at different speeds has a transmission and a torque converter. The transmission has first and second input portions receiving the power, and means for transmitting or interrupting the received power, the clutch or brake being controlled for selectively attaining multiple speeds. The torque converter is arranged between the engine and the transmission, and has a fluid coupling, a planetary gear train at the fluid coupling side, a lock-up clutch device, and a one-way clutch.

The fluid coupling has an impeller, a turbine opposed to the impeller and a stator arranged between the impeller and the turbine. The planetary gear train at the fluid coupling side has a fluid-coupling-side ring gear coupled to the turbine, a fluid-coupling-side planetary gear meshing with the ring gear, a fluid-coupling-side carrier coupled to a first input of the transmission and carrying the planetary gear, and a fluid-coupling-side sun gear coupled to the stator and meshing with the planetary gear, and is operable to supply the output rotation of the fluid coupling from the carrier and the sun gear. The lock-up clutch device is provided for directly transmitting or interrupting the power supplied from the engine with respect to the carrier of the planetary gear train. The one-way clutch transmits the power to a second input of the transmission only when the stator rotates reversely to the impeller and the turbine.

According to the above apparatus, the power supplied from the engine is transmitted to the transmission through the torque converter when the lock-up clutch device is disengaged. In the torque converter, the power supplied from the engine is distributed to the carrier and the sun gear via the ring gear coupled to the turbine. These powers are integrated by the transmission for output. When the lock-up clutch device is engaged, the power supplied from the engine is directly transmitted to the transmission.

The power of the engine is divided into the forward rotation power of the carrier and the reverse rotation power of the sun gear, and the clutch and the brake in the transmission are controlled, whereby the gear ratios of the carrier and the sun gear are controlled. Therefore, the gear ratios ideal for off-road vehicles can be achieved by setting the gear ratios to change in geometric progression, and in other words, such gear ratios that a lower speed ratio has a progressively larger value. Also, an engine brake can function at all the speeds. Further, it is possible to provide a multi-speed transmission having a simple structure and can be manufactured at a low cost.

According to a second aspect, the automatic transmission apparatus of the first aspect further has such a feature that the transmission has a plurality of forward speeds and one reverse speed, the power is supplied from the turbine and the stator when the forward 1st speed and the reverse are selected, and the power is supplied only from the turbine at the other speeds.

In this structure, the output power increases at the forward 1st speed and the reverse.

According to a third aspect, the automatic transmission apparatus of the second aspect further has such a feature that the transmission has first and second planetary gear trains, a clutch device, and first, second and third brake devices. The first planetary gear train has a first sun gear coupled to the stator through the one-way clutch, a first planetary gear meshing with the first sun gear, a carrier carrying the first planetary gear, and a first ring gear meshing with the first planetary gear. The second planetary gear train has a second sun gear coupled to the carrier at the fluid coupling side, a second planetary gear meshing with the second sun gear and the first planetary gear, and carried by the carrier of the first planetary gear train, and a second ring gear meshing with the second planetary gear. The clutch device selectively connects and disconnects the first and second sun gears. The first brake device brakes rotation of the first sun gear. The second brake device brakes rotation of the first ring gear. The third brake device brakes rotation of the second ring gear.

According to this structure, the power is supplied from the turbine and the stator when the third brake device operates. When the first brake device operates or the clutch device is engaged, the power is supplied only from the turbine. When the second brake device operates, the powers in a reverse rotating direction are supplied from the turbine and the stator.

According to a fourth aspect, the automatic transmission apparatus of the third aspect further includes an output shaft coupled to the carrier.

According to a fifth aspect, the automatic transmission apparatus of the second aspect has such a feature that the transmission has first and second planetary gear trains, a clutch device, and first, second and third brake devices. The first planetary gear train has a first sun gear coupled to the stator via the one-way clutch, a first planetary gear meshing with the first sun gear, a first carrier carrying the first planetary gear, and a first ring gear meshing with the first planetary gear. The second planetary gear train has a second sun gear coupled to the first sun gear, a second planetary gear meshing with the second sun gear, a second carrier carrying the second planetary gear and coupled to the first ring gear, and a second ring gear meshing with the second planetary gear and coupled to the carrier of the torque convertor. The clutch device selectively connects and disconnects the first and second sun gears with respect to the carrier of the torque converter. The first brake device brakes rotation of the first and second sun gears. The second brake device brakes rotation of the second ring gear. The third brake device brakes rotation of the first carrier.

In this apparatus, the power is supplied from the turbine and the stator when the third brake operates. When the first brake operates or the clutch device is engaged, the power is supplied only from the turbine. When the second brake operates, the powers in a reverse rotating direction are supplied from the turbine and the stator.

According to a sixth aspect, the automatic transmission apparatus of the fifth aspect further includes an output gear coupled to the first ring gear and the second carrier.

According to a seventh aspect, the automatic transmission apparatus of the second aspect further has such a feature that the transmission has first and second planetary gear trains, a clutch device, and first, second and third brake devices. The first planetary gear train has a first sun gear coupled to the stator through the one-way clutch, a first planetary gear meshing with the first sun gear, a first carrier carrying the first planetary gear, and a first ring gear meshing with the first planetary gear. The second planetary gear train has a second sun gear coupled to the carrier of the torque converter, and a second planetary gear carried by the first carrier and meshing with the second sun gear and the first planetary gear. The clutch device selectively connects and disconnects the first carrier with respect to the carrier of the torque convertor and the second sun gear. The first brake device brakes rotation of the first sun gear. The second brake device brakes rotation of the carrier of the torque convertor and the second sun gear. The third brake device brakes rotation of the first carrier.

In this apparatus, the power is likewise supplied from the turbine and the stator when the third brake operates. When the first brake operates or the clutch device is engaged, the power is supplied only from the turbine. When the second brake operates, the powers in a reverse rotating direction are supplied from the turbine and the stator.

According to an eighth aspect, the automatic transmission apparatus of the seventh aspect further includes an output gear coupled to the first ring gear.

According to a ninth aspect, the automatic transmission apparatus of the second aspect further has such a feature that the transmission has first and second planetary gear trains, a clutch device, and first, second and third brake devices. The first planetary gear train has a first sun gear coupled to the stator through the one-way clutch, a first planetary gear meshing with the first sun gear, a second planetary gear arranged radially outside the first planetary gear and meshing with the first planetary gear, and a carrier carrying the first and second planetary gears. The second planetary gear train has a second sun gear coupled to the carrier of the torque converter and meshing with the second planetary gear, and a ring gear meshing with the second planetary gear. The clutch device selectively connects and disconnects the carrier of the torque converter with respect to the first sun gear. The first brake device brakes rotation of the first sun gear. The second brake device brakes rotation of the carrier of the torque converter and the second sun gear. The third brake device brakes rotation of the ring gear.

According to this structure, the operation is performed similarly to the apparatus of the third aspect.

According to a tenth aspect, the automatic transmission apparatus of the ninth aspect further includes an output gear coupled to the carrier of the transmission.

According to an eleventh aspect, the automatic transmission apparatus of the second aspect further has such a feature that the transmission has first and second planetary gear trains, a clutch device, and first, second and third brake devices. The first planetary gear train has a first sun gear coupled to the stator through the one-way clutch, a first planetary gear meshing with the first sun gear, a first carrier carrying the first planetary gear, and a first ring gear meshing with the first planetary gear. The second planetary gear train has a second sun gear coupled to the carrier of the torque converter, a second planetary gear meshing with the second sun gear, a second carrier carrying the second planetary gear and coupled to the first ring gear, and a second ring gear meshing with the second planetary gear and coupled to the first carrier. The clutch device selectively connects and disconnects the carrier of the torque converter with respect to the first sun gear. The first brake device brakes rotation of the first sun gear. The second brake device brakes rotation of the carrier of the torque converter and the second sun gear. The third brake device brakes rotation of the first carrier and the second ring gear.

According to a twelfth aspect, the automatic transmission apparatus of the eleventh aspect further includes an output gear coupled to the second carrier of the transmission.

According to a thirteenth aspect, the automatic transmission apparatus of the first aspect has such a feature that the transmission has a plurality of forward speeds and one reverse speed, and the power is supplied from the turbine and the stator at all the speeds.

According to a fourteenth aspect, the automatic transmission apparatus of the thirteenth aspect has such a feature that the transmission has a first input shaft coupled to the carrier of the torque converter, a second input shaft coupled to the stator through the one-way clutch, an input gear arranged at an end of the second input shaft, a first counter gear meshing with the input gear, a second counter gear meshing with the first counter gear, a third counter gear for coupling the second counter gear to the first input shaft, a first counter shaft carrying the first counter gear, a second counter shaft carrying the second and third counter gears, and a clutch device for selectively connecting and disconnecting the first input shaft with respect to the first and second counter shafts.

According to this apparatus, the forward rotation power of the turbine and the reverse rotation power of the stator are integrated for output. By engaging or disengaging the clutch device, the speed ratios can be selected.

According to a fifteenth aspect, the automatic transmission apparatus of the thirteenth aspect has such a feature that the transmission has a first input shaft coupled to the carrier of the torque converter, a second input shaft coupled to the stator through the one-way clutch, a first bevel gear fixed at an end of the first input shaft, a second bevel gear fixed at an end of the second input shaft and opposed to the first bevel gear, third and fourth bevel gears opposed to each other and meshing with the first and second bevel gears, respectively, a differential mechanism having a wheel drive shaft, and a clutch mechanism for selectively coupling outputs of the third and fourth bevel gears to the differential mechanism.

The foregoing and other objects, features, aspects and advantages of the present invention will become more apparent from the following detailed description, when taken in conjunction with the accompanying drawings.

BRIEF DESCRIPTION OF THE DRAWINGS

FIG. 16 is a chart showing characteristics of various states of operation of the torque converter and transmission in accordance with the sixth embodiment depicted in FIG. 15;

FIG. 18 is a chart showing characteristics of various states of operation of the torque converter and transmission in accordance with the seventh embodiment depicted in FIG. 17.

DESCRIPTION OF THE PREFERRED EMBODIMENTS

BASIC TORQUE CONVERTER AND TRANSMISSION

A basic configuration of the invention will now be described below.

Figures 1, 2:
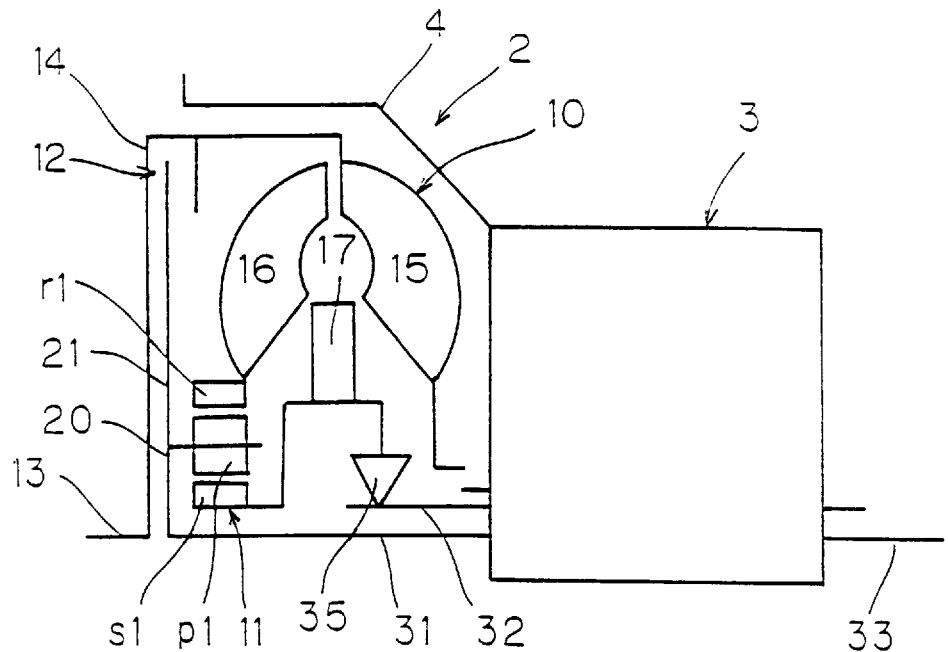
FIG. 1 is a schematic side view showing a basic structure of torque convertor used with an automatic transmission in accordance with the present invention.
FIG. 2 is a table showing transmission characteristics of the basic embodiment of the present invention depicted in FIG. 1.

In FIG. 1, an automatic transmission apparatus has a fluid coupling assembly, i.e., a torque converter 2 receiving a power from an engine, and a transmission 3 arranged at an output side of the torque converter 2. The torque converter 2 and the transmission 3 are arranged in a housing 4.

The torque converter 2 has a torque converter mechanism 10, a planetary gear train 11 arranged within the torque converter 2, and a lock-up clutch device 12 for directly transmitting the power of the engine to an output side.

The torque converter mechanism 10 has a front cover 14 coupled to an output 13 of the engine, an impeller 15 connected to the front cover 14, a turbine 16 axially opposed to the impeller 15 and a stator 17 arranged between radially inner portions of the impeller 15 and the turbine 16.

The planetary gear train 11 is arranged radially inside the turbine 16. The planetary gear train 11 has a ring gear r1 coupled to the turbine 16, a plurality of planetary gears p1 meshing with the ring gear r1, and a cylindrical sun gear s1 arranged at the center and meshing with the planetary gears p1. The planetary gears p1 are held by a planetary carrier 20. The planetary carrier 20 has a coupling portion holding the planetary gears p1, and a shaft extending from the center of the coupling portion through the center of the sun gear s1. The sun gear s1 is fixed to the stator 17 such that it does not rotate relative to the stator 17.

The lock-up clutch device 12 is located between the turbine 16 and the front cover 14, and has an output member 21 provided at its outer peripheral portion with a friction surface which can be pressed against the front cover 14.

The transmission 3, of which specific structures will be described later as various embodiments, basically has two input portions, i.e., first and second input shafts 31 and 32, a single output shaft 33, and a power transmission control mechanism formed of a plurality of brakes, clutches and gears, as described in greater detail below with respect to the various embodiments.

The first input shaft 31, as depicted in FIG. 1, defines a first output shaft of the torque converter 2. The second input shaft 32 defines a second output shaft of the torque converter 2. The planetary carrier 20 of the planetary gear train 11 and the output member 21 of the lock-up clutch device 12 are fixed to the first input shaft 31. The stator 17 is coupled to the second shaft 32 via a one-way clutch 35. Therefore, the sun gear s1 of the planetary gear train 11 is also coupled to the second input shaft 32 via the one-way clutch 35. The one-way clutch 35 allows the stator 17 (sometimes referred to as a reactor) to rotate in only one direction relative to the shaft 32 and hence allows transmission only a reverse rotation power, which is produced when the stator 17 rotates in a direction opposite to the turbine 16, to the second input shaft 32.

According to the above structure, the torque converter can selectively attain two operation states by selecting the disengaged and engaged states of the lock-up clutch device 12. When the lock-up clutch device 12 is engaged, the rotation power is directly transmitted from the engine output 13 to the first input shaft 31 through the front cover 14.

When the lock-up clutch device 12 is disengaged, the rotation power transmitted from the engine output 13 to the impeller 15 through the front cover 14 is transmitted to the turbine 16 and the stator 17 through a working fluid. It is assumed that the sun gear s1 has teeth of Za0 in number, and the ring gear r1 has teeth of Zr0 in number. In this case, the power transmitted from the turbine 16 to the ring gear r1 is distributed to the planetary carrier 20 at a rate of $\{(Za0+Zr0)/Zr0\}$, and is transmitted to the sun gear s1 at a rate of $(-Za0/Ze0)$.

The power transmission control mechanism of the transmission 3 can achieve the following four connection states (first to fourth connection states). The connections states are also referred to in the art as speeds or gear ratios, each connection state or speed having its own gear ratio (input speed verses output speed).

Depending on combination of the states of the torque converter 2 and the transmission 3, various transmission states can be attained. These transmission states will now be described below with reference to FIG. 2. In FIG. 2 and the following description, "OWC" represents a state where the lock-up clutch device 12 is disengaged and the one-way clutch 35 performs power transmission, and "L/U" represents a state that the lock-up clutch device 12 is engaged.

(1) First State

In the first state, the transmission 3 transmits the forward rotation power of the first input shaft 31 at a transmission ratio A1 to the output shaft 33, and also transmits the reverse rotation power (in the direction opposite to the rotating direction of the first input shaft 31) of the second input shaft 32 at a transmission ratio of –D1 to the output shaft 33. In the above characters "–D1", the negative sign "–" represents the reverse rotation.

(1-1) First state and engaged state of the lock-up clutch device (L/U in FIG. 2).

When the transmission 3 is in the first state and the lock-up clutch device 12 is engaged, the power of the engine is directly transmitted to the first input shaft 31 as already described, and is output from the output shaft 33 at a turbine transmission ratio equal to the transmission ratio A1 of the transmission 3 (i.e., gear ratio between the front cover 14 and the output shaft 33 in this state). In this state, the turbine 16 and the stator 17 rotate at the same rotation speed as the impeller 15, and the working fluid does not transmit the rotation power. Although the second input shaft 32 rotates in a reverse direction, the power is not transmitted to the second shaft 32, because the stator 17 rotates in a forward direction.

(1-2) First state and disengaged state of the lock-up clutch device 12 (OWC in FIG. 2).

When the transmission 3 is in the first state and the lock-up clutch device 12 is disengaged to operate the one-way clutch 35, the various portions operate as follows. The one-way clutch 35 directly transmits the reverse rotation power of the stator 17 to the second input shaft 32, of which rotation power is transmitted at a transmission ratio of –D1 to the output shaft 33. Therefore, a stator transmission ratio between the stator 17 and the output shaft 33 is equal to –D1. Also, the ring gear r1 coupled to the turbine 16 tends to rotate reversely the sun gear s1 at a transmission ratio of $(-Za0/Zr0)$. However, the sun gear s1 is coupled to the second input shaft 32 through the one-way clutch 35, so that the sun gear s1 rotates in the same direction as the second input shaft 32 (i.e., reversely rotates). Therefore, the turbine transmission ratio (transmission ratio between the turbine 16 and the output shaft 33) is equal to a sum of a product of the transmission ratio (A1) of the first output shaft 31 and a power distribution ratio $\{(Za0+Zr0)/Zr0\}$ of the planetary carrier 20 and a product of the transmission ratio (–D1) of the second input shaft 32 and a power distribution ratio $(-Za0/Zr0)$ of the sun gear s1.

(2) Second State

In the second state, the transmission 3 transmits the forward rotation power of the first input shaft 31 at a transmission ratio A2 to the output shaft 33, and the second input shaft 32 is fixed.

(2-1) Second state and engaged state of the lock-up clutch device 12 (L/U in FIG. 2).

When the lock-up clutch device 12 is engaged in the second state, the power is directly transmitted from the engine to the first input shaft 31 as already described, and is output at the turbine transmission ratio (transmission ratio between the front cover 14 and the output shaft 33 in this state) equal to the transmission ratio A2 of the transmission 3 from the output shaft 33.

(2-2) Second state and disengaged state of the lock-up clutch device 12 (OWC in FIG. 2).

When the lock-up clutch device 12 is disengaged and the one-way clutch 35 is operated, the various portions operate as follows. First, the ring gear r1 coupled to the turbine 16 tends to rotate reversely the sun gear s1 at a transmission ratio $(-Za0/Zr0)$. However, the sun gear s1 is coupled to the second input shaft 32 via the one-way clutch 35, and the second input shaft 32 is fixed, so that the sun gear s1 is also fixed. Therefore, the turbine transmission ratio is equal to a product of the transmission ratio (A2) of the first input shaft 31 and the power distribution ratio $\{(Za0+Zr0)/Zr0\}$ of the planetary carrier 20.

In this operation, the turbine 16 and the stator 17 receive the rotation power in the same manner as that in the first state (1-1) wherein the lock-up clutch device 12 is disengaged. However, the rotation power is not output from the stator 17, and only the forward rotation speed of the turbine 16 is output.

(3) Third State

In the third state, the transmission 3 integrates the first and second input shafts 31 and 32 with each other and directly couples them to the output shaft 33.

(3-1) Third state and engaged state of the lock-up clutch device 12 (L/U in FIG. 2)

In the third state, when the lock-up clutch device 12 is engaged, the power of the engine is directly transmitted to the first input shaft 31 as already described, and is output at a transmission ratio of 1:1 from the output shaft 33.

(3-2) Third state and disengaged state of the lock-up clutch device 12 (OWC in FIG. 2)

Since the first and second input shafts 31 and 32 are integrated with each other, the turbine 16 and the stator 17 are also integrated with each other, and the respective parts of the planetary gear train 11 perform integral rotation. The rotation power of the planetary gear train 11 is transmitted to the first input shaft 31, and is output at a transmission ratio 1:1 from the output shaft 33.

(4) Fourth State

In a fourth state, the transmission fixes the first input shaft 31 so that it cannot rotate, and the reverse rotation power of the second input shaft 32 is transmitted at a transmission ratio D4 to the output shaft 33. Thus, the reverse drive state is attained, so that the lock-up clutch device 12 is not engaged. Therefore, the turbine 16 always operates to transmit the power, and the one-way clutch 35 always operates.

The first input shaft 31 is fixed, and therefore the planetary carrier 20 is fixed, so that the ring gear r1 coupled to the turbine 16 tends to rotate reversely the second input shaft 32 at a transmission ratio of $(-Za0/Zr0)$. The reverse rotation power of the stator 17 acts to rotate reversely the second input shaft 32. These two powers are transmitted at a stator transmission ratio (transmission ratio between the stator 17 and the output shaft 33) equal to the transmission ratio D4 of the transmission 3 to the output shaft 33.

Generally, in the torque converter 2, a reverse rotation force is applied to the stator 17 only when the transmission ratio between the impeller 15 and the turbine 16 is lower than a predetermined value. When it exceeds the predetermined value, a forward rotation force is applied to the stator 17. These characteristics are shown in FIG. 3.

Figure 3:
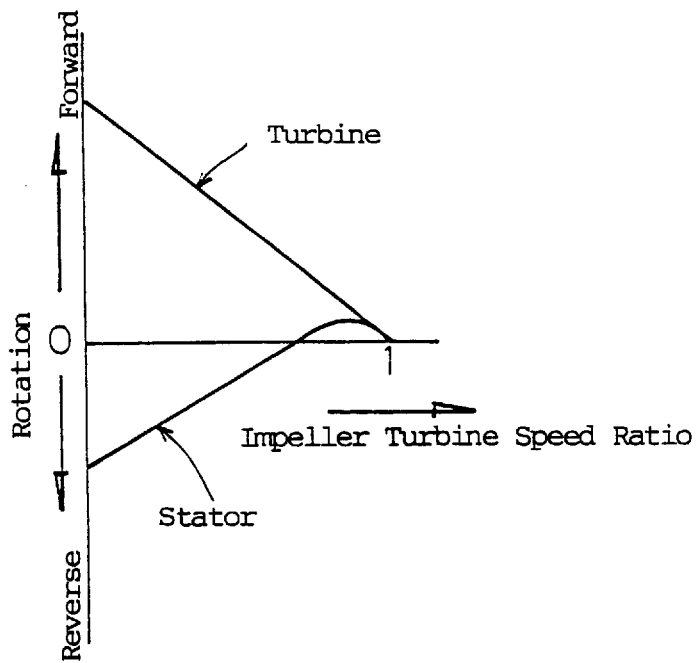
FIG. 3 is a graph showing operation characteristics of a torque converter.
Figure 4:
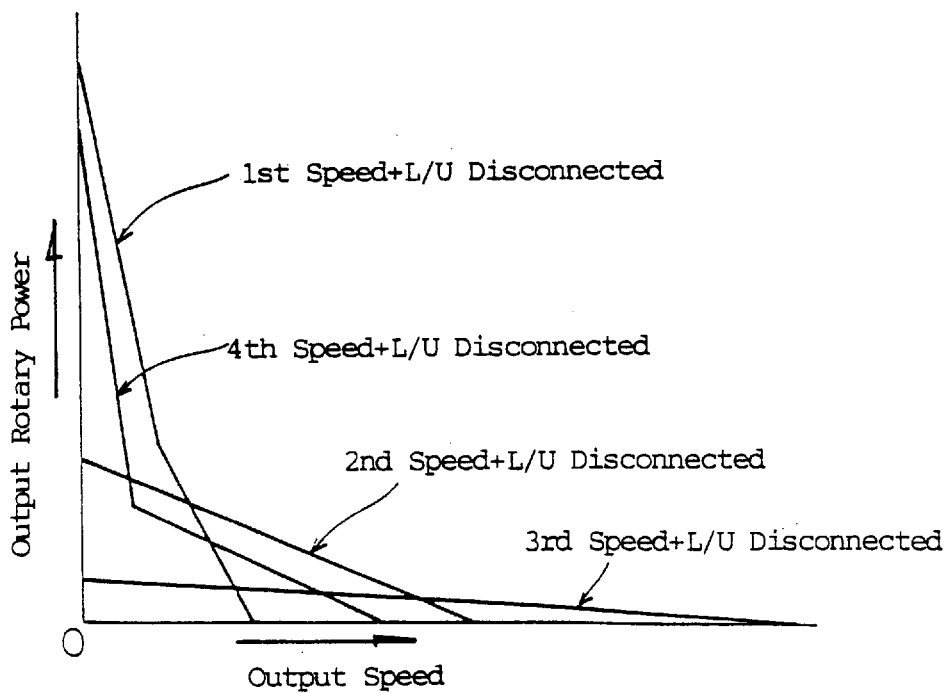
FIG. 4 is a graph showing operation characteristics of the automatic transmission and torque converter in accordance with the present invention as depicted in FIG. 1.

FIG. 4 shows comprehensive output characteristics obtained by combination of the characteristics in FIG. 3 and the output characteristics in the first to fourth states and particularly in the disengaged state of the lock-up clutch device 12.

Description will now be given on a reverse driving state (i.e., engine brake state) in which the output shaft 33 drives the engine (deceleration of a vehicle equipped with the present invention). When the lock-up clutch device 12 is engaged, the engine output 13 and the output shaft 33 are directly coupled together via gears and other in the transmission 3, so that the engine brake direction operates.

When the lock-up clutch device 12 is disengaged in the third state, the turbine 16 and the stator 17 are integrated with each other, and operate to rotate the impeller 15 through working fluid, so that the engine brake operates.

When the lock-up clutch device 12 is disengaged in the first or second state, the rotation power of the output shaft 33 is transmitted to the first input shaft 31 via gears and others in the transmission 3 and tends to rotate the planetary carrier 20. This power is transmitted at a power distribution rate of $\{Zr0/(Za0+Zr0)\}$ to the ring gear r1, and is also transmitted at a power distribution rate of $\{Za0/(Za0+Zr0)\}$ to the sun gear s1. In this state, the turbine 16 coupled to the ring gear r1 and the stator 17 coupled to the sun gear s1 receive the forward rotation powers at the foregoing rate, respectively, and tend to rotate faster than the impeller 15, so that the turbine 16 forces the fluid toward the impeller 15. As a result, the engine brake acts on the impeller 15. Thus, the whole apparatus reaches a state allowing engine braking.

Specific embodiments of the transmission 3 will now be described below.

FIRST EMBODIMENT

Figures 5, 6:
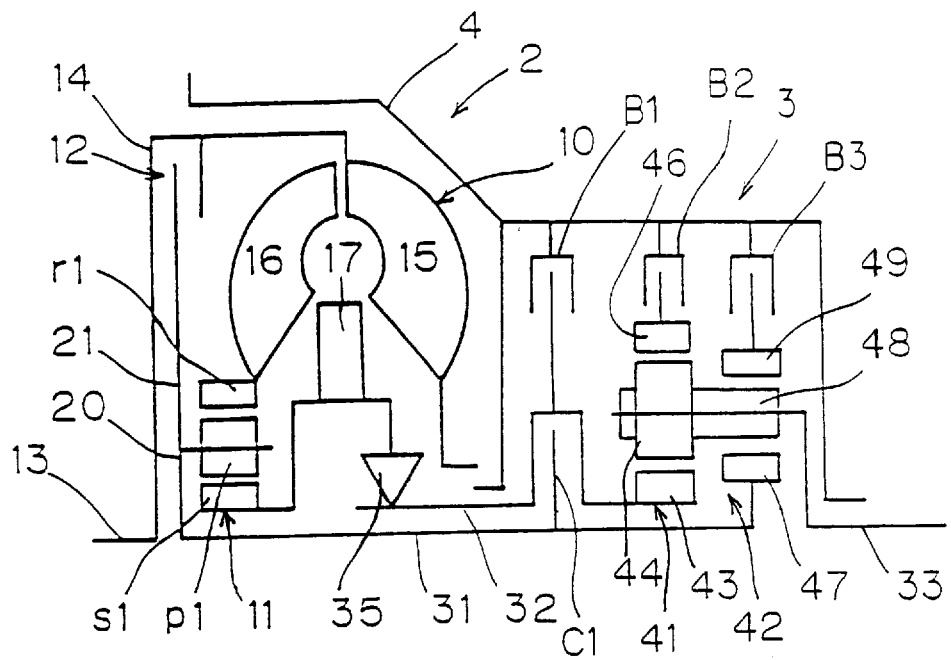
FIG. 5 is a side schematic view showing the torque converter and a transmission in accordance with a first embodiment of the present invention.
FIG. 6 is a chart showing characteristics of various states of operation of the torque convertor and transmission in accordance with the first embodiment depicted in FIG. 5.

The transmission 3 shown in FIG. 5 has generally the same internal structure as that disclosed in the aforementioned Japanese Patent No. 1,965,369 (Japanese Application No. 60-25906) from which U.S. Pat. No. 5,122,104 claims priority. U.S. Pat. No. 5,122,104 is incorporated herein by reference. The transmission 3 more specifically has the following structure.

The transmission 3 has first and second planetary gear trains 41 and 42. The first planetary gear train 41 has a first sun gear 43 which has teeth of $Za1=21$ (twenty one) in number and is connected to the second input shaft 32 and therefore to the stator 17 via the one-way clutch 35, first planetary gears 44 meshing with the first sun gear 43, a carrier 45 carrying the first planetary gears 44, and a first ring gear 46 which has teeth of $Zr1=87$ (eighty seven) in number and meshes with the first planetary gears 44.

The second planetary gear train 42 has a second sun gear 47 which is coupled to the first input shaft 31 and therefore the planetary carrier 20 and has teeth of $Za2=36$ (thirty six) in number, second planetary gears 48 which mesh with the second sun gear 47 and the first planetary gears 44, and are carried by the carrier 45 of the first planetary gear train 41, and a second ring gear 49 meshing with the second planetary gears 48 and having teeth of $Zr2=72$ (seventy two) in number. The output shaft 33 is coupled to the carrier 45.

The transmission 3 further has a clutch device C1 operable to connect the first and second sun gears 43 and 47 together, a first brake device B1 for braking rotation of the first sun gear 43, a second brake device B2 for braking rotation of the first ring gear 46, and a third brake device B3 for braking rotation of the second ring gear 49.

According to this structure, the foregoing first state can be attained by operating the third brake device B3 to stop the second ring gear 49 as can be seen from FIGS. 5 and 6. In this state, the forward 1st speed can be selected by allowing operation of the one-way clutch 35 (i.e., disengaging the lock-up clutch device 12), and the forward 2nd speed can be selected by engaging the lock-up clutch device 12. The foregoing second state is attained by operating the first brake device B1. In this state, the forward 3rd speed can be selected by allowing operation of the one-way clutch 35

(i.e., disengaging the lock-up clutch device 12), and the forward 4th speed can be selected by engaging the lock-up clutch device 12.

The foregoing third state can be attained by allowing operation of the clutch device C1. In this state, the forward 5th speed is selected by engaging the lock-up clutch device 12. The reverse in the foregoing first state is selected by operating the second brake device B2 and disengaging the lock-up clutch device 12.

As described above, the automatic transmission apparatus has five forward speeds and one reverse speed, and the power is supplied from the turbine 16 and the stator 17 when the forward 1st speed and the reverse are selected. When the other speeds are selected, the power is supplied only from the turbine 16.

Values of the gear ratios shown in FIG. 6 are obtained when the number Za0 of teeth of the sun gear s1 of the torque converter s1 is 20, the number Zr0 of teeth of the ring gear r1 thereof is 56 and the gears of the transmission 3 have the teeth of the foregoing numbers. As can be seen from these values, the speed ratio increases in geometric progression as the speed is lowered from the 4th speed.

SECOND EMBODIMENT

Figures 7, 8:
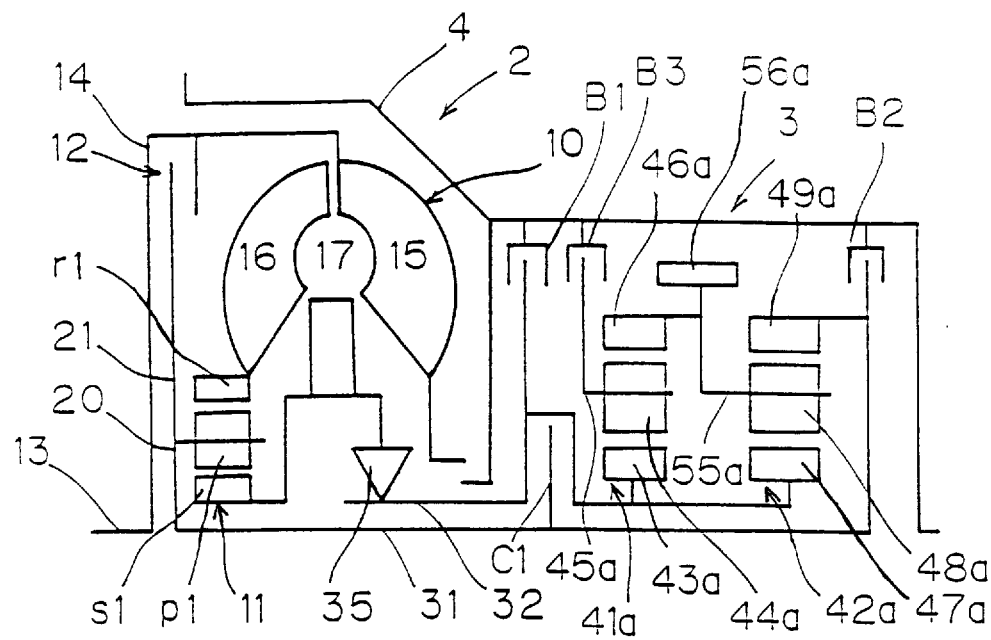
FIG. 7 is a side schematic view showing the torque converter and a transmission in accordance with a second embodiment of the present invention.
FIG. 8 is a chart showing characteristics of various states of operation of the torque convertor and transmission in accordance with the second embodiment depicted in FIG. 7.

The transmission 3 shown in FIG. 7 has generally the same internal structure as that disclosed in the aforementioned Japanese Patent No. 1,871,294 (Japanese Application No. 61-101504) from which U.S. Pat. Nos. 4,869,128 and 4,942,779 claim priority. U.S. Pat. Nos. 4,869,128 and 4,942,779 are incorporated herein by reference. The transmission 3 shown in FIG. 7 has the following structure. Combination of this transmission 3 and the torque converter 2 already described can achieve the transmission characteristics shown in FIG. 8.

The transmission 3 has first and second planetary gear trains 41a and 42a. The first planetary gear train 41a has a first sun gear 43a which is coupled to the second input shaft 32 and has teeth of Za1=33 (thirty three) in number, first planetary gears 44a meshing with the first sun gear 43a, a first carrier 45a carrying the first planetary gears 44a, and a first ring gear 46a meshing with the first planetary gears 44a and having teeth of Zr1=72 (seventy two) in number.

The second planetary gear train 42a has a second sun gear 47a coaxially coupled to the first sun gear 43a and having teeth of Za2=33 (thirty three) in number, second planetary gears 48a meshing with the second sun gear 47a, a second carrier 55a carrying the second planetary gear 48a and coupled to the first ring gear 46a, and a second ring gear 49a which meshes with the second planetary gears 48a, is coupled to the first input shaft 31 and has teeth of Zr2=72 (seventy two) in number. Instead of the output shaft 33 in FIG. 5 forming the output, an output gear 56a is arranged coaxially with the first input shaft 31, and the first ring gear 46a and the second carrier 55a are fixed to the output gear 56a.

The transmission 3 has a clutch device C1 for connecting the first and second sun gears 43a and 47a to the first input shaft 31, a first brake device B1 for braking rotation of the first and second sun gears 43a and 47a, a second brake device B2 for braking rotation of the second ring gear 49a, and a third brake device B3 for braking rotation of the first carrier 45a.

The transmission characteristics are shown in FIG. 8 and are described below.

THIRD EMBODIMENT

Figures 9, 10:
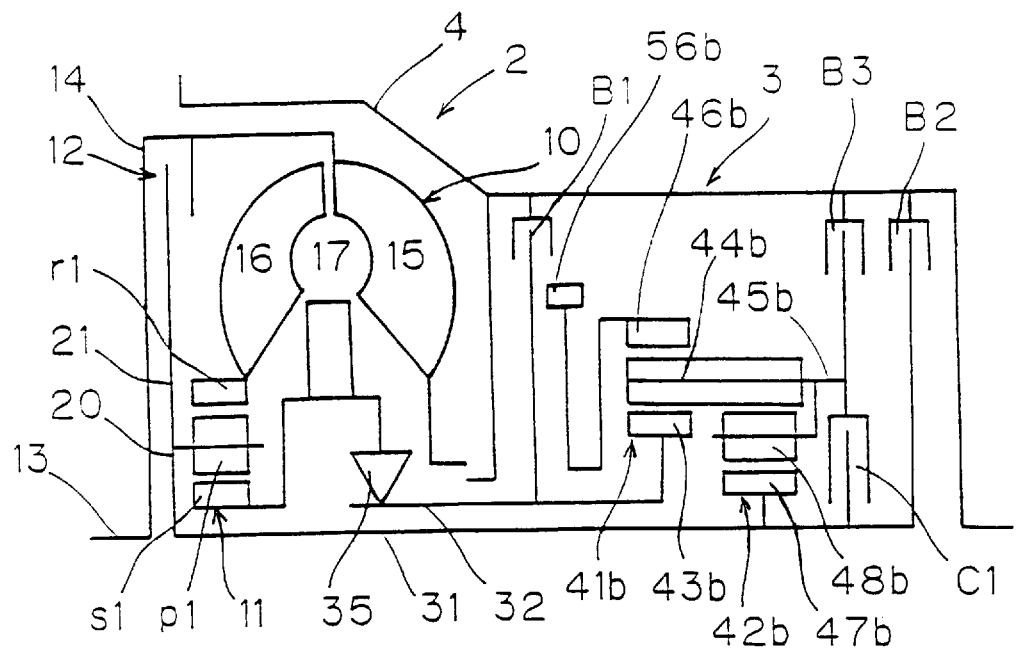
FIG. 9 is a schematic side view showing the torque converter and a transmission in accordance with a third embodiment of the present invention.
FIG. 10 is a chart showing characteristics of various states of operation of the torque converter and transmission in accordance with the third embodiment depicted in FIG. 9.

The transmission 3 shown in FIG. 9 has generally the same internal structure as that disclosed in the aforementioned Japanese Patent No. 1,896,991 (Japanese Application No. 61-101,505), from which U.S. Pat. Nos. 4,869,128 and 4,942,779 claim priority. The transmission 3 shown in FIG. 9 has the following structure. Combination of the transmission 3 in FIG. 9 and the torque converter 2 achieve the transmission characteristics shown in FIG. 10.

The transmission 3 has first and second planetary gear trains 41b and 42b. The first planetary gear train 41b has a first sun gear 43b coupled to the second input shaft 32 and have teeth of Za1=34 (thirty four) in number, first planetary gears 44b meshing with the first sun gear 43b, a first carrier 45b carrying the first planetary gears 44b, and a first ring gear 46b meshing with the first planetary gears 44b and having teeth of Zr1=74 (seventy four) in number.

The second planetary gear train 42b has a second sun gear 47b coupled to the first input shaft 31 and having teeth of Za2=29 (twenty nine) in number, and second planetary gears 48b which are carried by the first carrier 45b and mesh with the second sun gear 47b and the first planetary gears 44b. An output gear 56b forming an output is coaxially fixed to the first ring gear 46b.

The transmission 3 has a clutch device C1 for selectively connecting and disconnecting the first carrier 45b with respect to the first input shaft 31 (planetary carrier 20) and the second sun gear 47b, a first brake device B1 for braking rotation of the first sun gear 43b, a second brake device B2 for braking rotation of the first input shaft 31 and the second sun gear 47b, and a third brake device B3 for braking rotation of the first carrier 45b.

Transmission characteristics shown in FIG. 10 are discussed below.

FOURTH EMBODIMENT

Figures 11, 12:
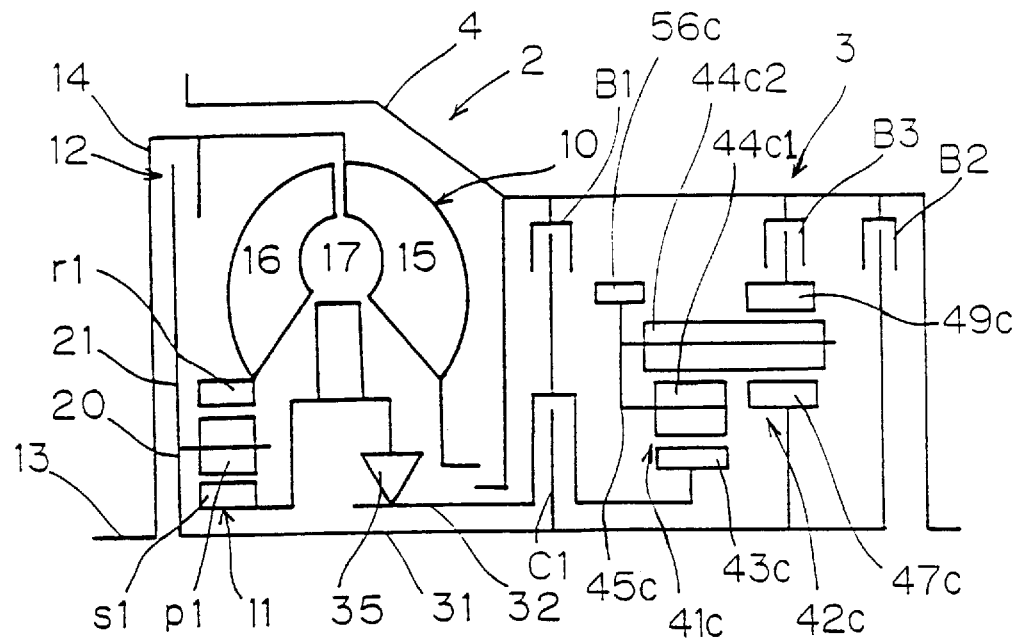
FIG. 11 is a side schematic view of the torque converter and a transmission in accordance with a fourth embodiment of the present invention.
FIG. 12 is a chart showing characteristics of various states of operation of the torque converter and transmission in accordance with the fourth embodiment depicted in FIG. 11.

The transmission 3 shown in FIG. 11 has generally the same internal structure as that disclosed in the aforementioned Japanese Patent No. 1,876,992 (Japanese Application No. 62-101506) from which U.S. Pat. Nos. 4,869,128 and 4,942,779 also claim priority. The transmission 3 shown in FIG. 11 has the following structure. Combination of the transmission 3 shown in FIG. 11 and the torque converter 2 achieve the transmission characteristics shown in FIG. 12.

The transmission 3 has first and second planetary gear trains 41c and 42c. The first planetary gear train 41c has a first sun gear 43c coupled to the second input shaft 32 and have teeth of Za1=21 (twenty one) in number, first planetary gears 44c1 meshing with the first sun gear 43c, second planetary gears 44c2 arranged radially outside the first planetary gears 44c1 and meshing with the first planetary gears 44c1, and a carrier 45c carrying the first and second planetary gears 44c1 and 44c2.

The second planetary gear train 42c has a second sun gear 47c coupled to the first input shaft 31 and having teeth of Za2=36 (thirty six) in number, and a ring gear 49c meshing with the second planetary gears 44c2 and having teeth of Zr1=72 (seventy two) in number. An output gear 56c forming an output is arranged coaxially with the first input shaft 31, and is fixed to the carrier 45c.

The transmission 3 further has a clutch device C1 for selectively connecting and disconnecting the first input shaft 31 (planetary carrier 20) with respect to the first sun gear 43c, a first brake device B1 for braking rotation of the first sun gear 43c, a second brake device B2 for braking rotation of the first input shaft 31 and the second sun gear 47c, and a third brake device B3 for braking rotation of the ring gear 49c.

Transmission characteristics shown in FIG. 12 is described below.

FIFTH EMBODIMENT

Figures 13, 14:
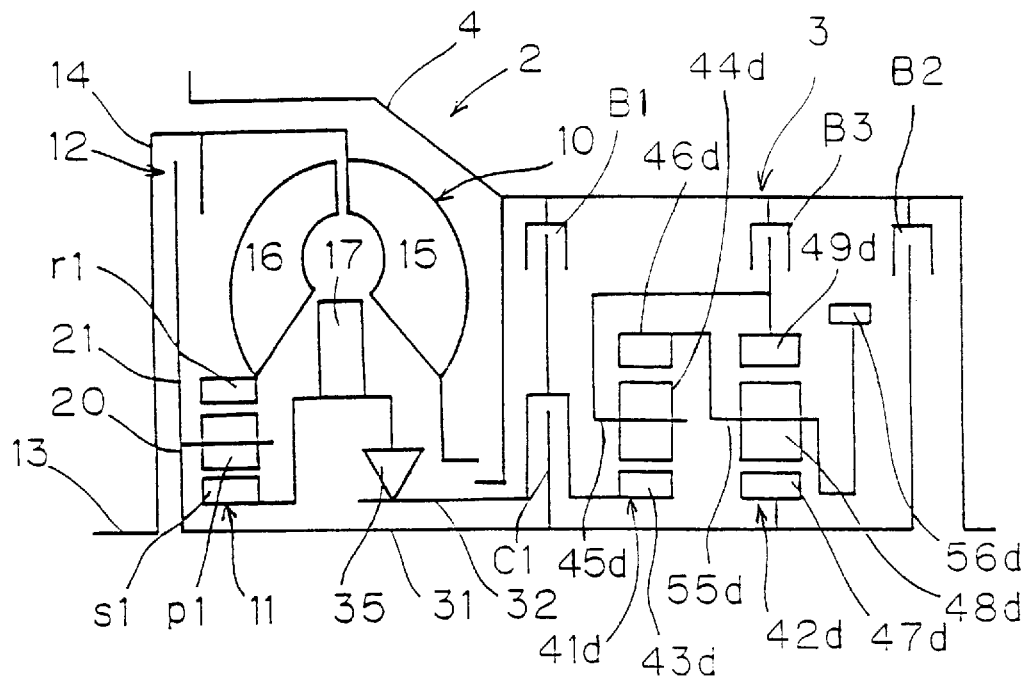
FIG. 13 is a side schematic view of the torque converter and a transmission in accordance with a fifth embodiment.
FIG. 14 is a chart showing characteristics of various states of operation of the torque converter and transmission in accordance with the fifth embodiment depicted in FIG. 13.

The transmission 3 shown in FIG. 13 has generally the same internal structure as that disclosed in Japanese Patent No. 1,963,199 (Japanese Application No. 61-101446) from which U.S. Pat. Nos. 4,869,128 and 4,942,779 also claim priority. The transmission shown in FIG. 13 has the following structure. Combination of the transmission 3 shown in FIG. 13 and the torque converter 2 achieve transmission characteristics shown in FIG. 14.

The transmission 3 has first and second planetary gear trains 41d and 42d. The first planetary gear train 41d has a first sun gear 43d coupled to the second input shaft 32 and have teeth of Za1=36 (thirty six) in number, first planetary gears 44d meshing with the first sun gear 43d, a first carrier 45d carrying the first planetary gears 44d, and a first ring gear 46d meshing with the first planetary gears 44d and having teeth of Zr1=75 (seventy five) in number.

The second planetary gear train 42d has a second sun gear 47d coupled to the first input shaft 31 and having teeth of Za2=42 (forty two) in number, second planetary gears 48d meshing with the second sun gear 47d, a second carrier 55d carrying the second planetary gears 48d and coupled to the first ring gear 46d, and a second ring gear 49d which meshes with the second planetary gears 48d, is coupled to the first carrier 45d and has teeth of Zr2=75 (seventy five) in number. An output gear 56d forming an output is arranged coaxially with the first input shaft 31, and is fixed to the second carrier 55d.

The transmission 3 further has a clutch device C1 for selectively connecting and disconnecting the first input shaft 31 (planetary carrier 20) with respect to the first sun gear 43d, a first brake device B1 for braking rotation of the first sun gear 43d, a second brake device B2 for braking rotation of the planetary carrier 20 and the second sun gear 47d, and a third brake device B3 for braking rotation of the first carrier 45d and the second ring gear 49d.

The structures in FIGS. 7 to 14 described above can attain the first state described before by operating the third brake device B3, as can be done in the first embodiment. In this state, when the one-way clutch 35 is operated (i.e., lock-up clutch device 12 is disengaged), the forward 1st speed is selected. By engaging the lock-up clutch device 12, the forward 2nd speed can be selected. The foregoing second state can be selected by operating the first brake device B1. In this state, the forward 3rd speed can be selected by operating the one-way clutch 35 (disengaging the lock-up clutch device 12). By engaging the lock-up clutch device 12, the forward 4th speed can be selected.

When the clutch device C1 is set to the operating state, the foregoing third state is attained. In this state, the forward 5th speed can be selected by engaging the lock-up clutch device 12. The reverse in the foregoing fourth state can be selected by operating the second brake device 52 and allowing operation of the one-way clutch 35.

As described above, the automatic transmission apparatuses in FIGS. 7 to 14 have five forward speeds and one reverse speed. When the forward 1st speed or the reverse is selected, the power is supplied from the turbine 16 and the stator 17. When the other speeds are selected, the power is supplied only from the turbine 16.

SIXTH EMBODIMENT

Figure 15:
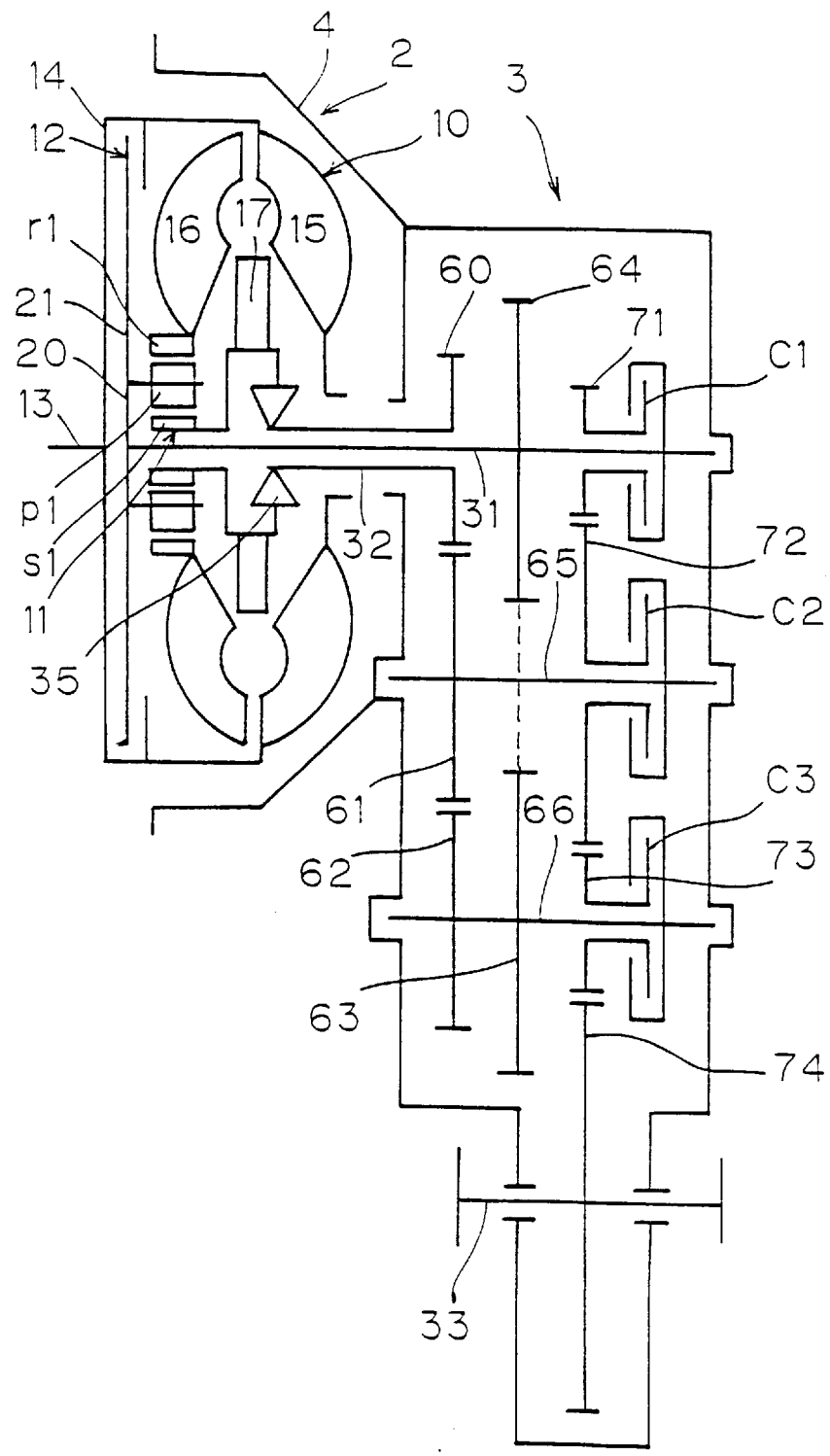
FIG. 15 is a side schematic view showing a sixth embodiment of the present invention.

The transmission 3 shown in FIG. 15 has generally the same internal structure as that disclosed in Japanese Patent No. 1,785,235 (Japanese Application No. 59-195410, Publication Number 61-74963). Japanese Patent No. 1,785,235 is incorporated herein by reference. The transmission 3 shown in FIG. 15 has the following structure. Combination of the transmission 3 and the torque converter 2 already described can achieve transmission characteristics shown in FIG. 16.

The transmission 3 has an input gear 60 attached to an end of the second input shaft 32 and having teeth of ZR1 in number, a first counter gear 61 meshing with the input gear 60 and having a teeth of ZR2 in number, a second counter gear 62 meshing with the first counter gear 61 and having teeth of ZR3 in number, and a third counter gear 63 having teeth of Zt3 in number for coupling the second counter gear 62 with the first input shaft 31. The first counter gear 61 is carried on a first counter shaft 65, and the second and third counter gears 62 and 63 are carried on the second counter shaft 66. The third counter gear 63 is coupled with a fourth gear 64 having teeth of Zt1 in number and arranged on the first input shaft 31.

The transmission 3 further includes a first gear 71 having teeth of Z1 in number, a second gear meshing with the first gear 71 and having teeth of Z2 in number, a third gear 73 meshing with the second gear 72 and having teeth of Z3 in number, and an output gear 74 meshing with the third gear 73. The first to third gears 71, 72 and 73 are coaxially and rotatably arranged around the first input shaft 31, the first counter shaft 65 and the second counter shaft 66, and can be selectively coupled to the corresponding shafts 31, 65 and 66 by the first, second and third clutches C1, C2 and C3, respectively. The output gear 74 is fixed on the output shaft 33.

According to this structure, the transmission 3 maintains the foregoing first state. When the third clutch C3 is engaged, the forward 1st and 2nd speeds can be selected by disengaging and engaging the lock-up clutch device 12. When the second clutch C2 is engaged, the forward 3rd and 4th speeds can be selected by disengaging and engaging the lock-up clutch device 12. When the first clutch C1 is engaged, the reverse 1st speed and the reverse 2nd speed (R1 and R2 in FIG. 16) can be selected by disengaging and engaging the lock-up clutch device 12.

SEVENTH EMBODIMENT

Figure 17:
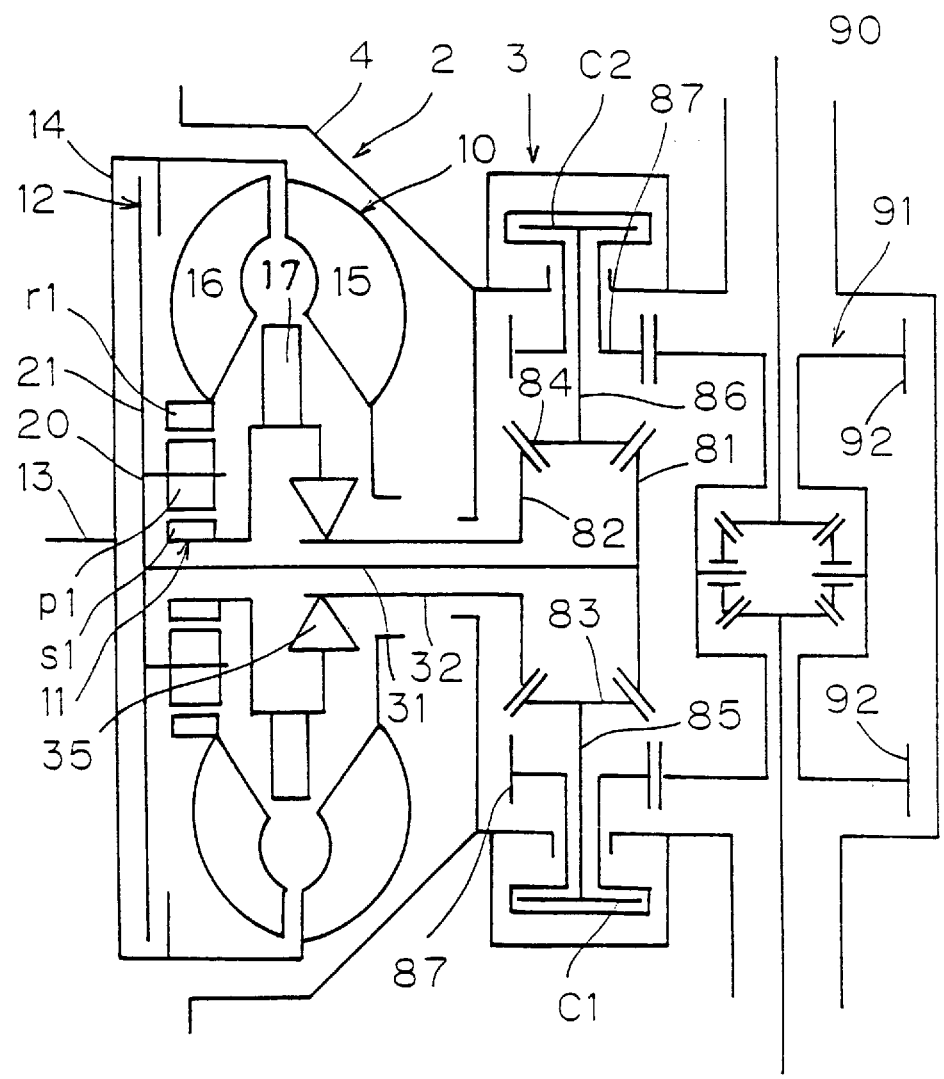
FIG. 17 is a side schematic showing a seventh embodiment of the present invention.

The transmission 3 shown in FIG. 17 has generally the same internal structure as that disclosed in Japanese Patent No. 1,962,867 (Japanese Application No. 60-7233, Publication No. 61-167770). Japanese Patent No. 1,962,867 is incorporated herein by reference. The transmission 3 has the following structure. Combination of the transmission 3 and the torque converter 2 achieve transmission characteristics shown in FIG. 18.

The transmission 3 has a first bevel gear 81 fixed at the end of the first input shaft 31 and having teeth of Z1 in number, and a second bevel gear 82 which is fixed at an end of the second input shaft 32, is opposed to the first bevel gear 81 and has teeth of Z1 in number, and also includes third and fourth bevel gears 83 and 84 which are opposed to each other, mesh with the first and second bevel gears 81 and 82, respectively, and each have teeth of Z2 in number. The third and fourth bevel gears 83 and 84 are fixed to the shafts 85 and 86, respectively.

Output gears 87 are coaxially and rotatably arranged on the shafts 85 and 86, respectively. The first clutch C1 is arranged for selectively coupling the shaft 85 to the corresponding output gear 87, and the second clutch C2 is arranged for selectively coupling the shaft 86 to the corresponding output gear 87. These output gears 87 are coupled to input gears 92 of a differential mechanism 91 having wheel drive shafts 90.

According to this structure, the transmission 3 maintains the foregoing first state. When the first clutch C1 is engaged, the forward 1st and 2nd speeds can be selected by disengaging and engaging the lock-up clutch device 12. When the second clutch C2 is engaged, the reverse 1st speed and the reverse 2nd speed can be selected by disengaging and engaging the lock-up clutch device 12.

According to the invention, as described above, a one-way clutch is not arranged between the sun gear and the stator in contrast to the prior art. Therefore, the automatic transmission apparatus can have a simple, light and compact structure, and can be manufactured at a low cost. Further, the engine brake can act at all the forward speeds. The apparatus has a sufficient number of shiftable speeds, and has transmission characteristics ideal for off-road vehicles and others, and in other words, such transmission characteristics that the gear ratio changes in geometric progression with change in selected speed.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. An automatic transmission apparatus for selectively outputting power of an engine at a plurality of differing speeds, comprising:

a transmission having first and second input portions configured to receive torque power, said transmission being configured for selectively transmitting the torque power at a plurality of differing speeds; and a torque converter disposed between the engine and said transmission, said torque converter having:

an impeller, a turbine, a stator, a lock-up clutch device and a planetary gear train, said impeller being disposed on a first axial side of said turbine, said stator being disposed axially between said turbine and said impeller, said lock-up clutch and said planetary gear being disposed on a second axial side of said turbine, said planetary gear train comprising a ring gear connected to said turbine, a carrier coupled to said first input portion of said transmission carrying a planetary gear engaged with said ring gear, and a sun gear coupled to said stator and meshing with said planetary gear, and said planetary gear train being operable to supply output rotation of said torque converter from said carrier and said sun gear, said lock-up clutch device being configured for selectively directly transmitting torque from the engine to said carrier of said planetary gear train, and said stator being mounted on a one-way clutch, said one-way clutch being connected to said second input portion of said transmission for transmitting the torque to said second input portion of said transmission in response to rotation of said stator in a direction opposite a rotation direction of said impeller and said turbine.

2. The automatic transmission apparatus according to claim 1, wherein said transmission is configured with a plurality of forward speeds and one reverse speed, torque is supplied from said turbine and said stator when a forward 1st speed and the reverse are selected, and said power is supplied only from said turbine at other speeds.

3. The automatic transmission apparatus according to claim 2, wherein said transmission comprises:

a first planetary gear train having a first sun gear coupled to said stator through said one-way clutch, a first planetary gear meshing with said first sun gear, a carrier carrying said first planetary gear, and a first ring gear meshing with said first planetary gear, a second planetary gear train having a second sun gear coupled to said carrier at a side proximate said torque converter, a second planetary gear meshing with said second sun gear and said first planetary gear, and carried by said carrier of said first planetary gear train, and a second ring gear meshing with said second planetary gear, a clutch device for selectively connecting and disconnecting said first and second sun gears, a first brake device for braking rotation of said first sun gear, a second brake device for braking rotation of said first ring gear, and a third brake device for braking rotation of said second ring gear.

4. The automatic transmission apparatus according to claim 3, further comprising an output shaft coupled to said carrier.

5. The automatic transmission apparatus according to claim 2, wherein said transmission comprises:

a first planetary gear train having a first sun gear coupled to said stator via said one-way clutch, a first planetary gear meshing with said first sun gear, a first carrier carrying said first planetary gear, and a first ring gear meshing with said first planetary gear, a second planetary gear train having a second sun gear coupled to said first sun gear, a second planetary gear meshing with said second sun gear, a second carrier carrying said second planetary gear and coupled to said first ring gear, and a second ring gear meshing with said second planetary gear and coupled to said carrier of said torque converter, a clutch device for selectively connecting and disconnecting said first and second sun gears with respect to said carrier of said torque converter, a first brake device for braking rotation of said first and second sun gears, a second brake device for braking rotation of said second ring gear, and a third brake device for braking rotation of said first carrier.

6. The automatic transmission apparatus according to claim 5, further comprising an output gear coupled to said first ring gear and said second carrier.

7. The automatic transmission apparatus according to claim 2, wherein said transmission includes:

a first planetary gear train having a first sun gear coupled to said stator through said one-way clutch, a first planetary gear meshing with said first sun gear, a first carrier carrying said first planetary gear, and a first ring gear meshing with said first planetary gear, a second planetary gear train having a second sun gear coupled to said carrier of said torque convertor, and a second planetary gear carried by said first carrier and meshing with said second sun gear and said first planetary gear, a clutch device for selectively connecting and disconnecting said first carrier with respect to said carrier of said torque converter and said second sun gear, a first brake device for braking rotation of said first sun gear, a second brake device for braking rotation of said carrier of said torque converter and said second sun gear, and a third brake device for braking rotation of said first carrier.

8. The automatic transmission apparatus according to claim 7, further comprising an output gear coupled to said first ring gear.

9. The automatic transmission apparatus according to claim 2, wherein
said transmission comprises:
a first planetary gear train having a first sun gear coupled to said stator through said one-way clutch, a first planetary gear meshing with said first sun gear, a second planetary gear arranged radially outside said first planetary gear and meshing with said first planetary gear, and a carrier carrying said first and second planetary gears,
a second planetary gear train having a second sun gear coupled to said carrier of said torque converter and meshing with said second planetary gear, and a ring gear meshing with said second planetary gear,
a clutch device for selectively connecting and disconnecting said carrier of said torque converter with respect to said first sun gear,
a first brake device for braking rotation of said first sun gear,
a second brake device for braking rotation of said carrier of said torque converter and said second sun gear, and
a third brake device for braking rotation of said ring gear.

10. The automatic transmission apparatus according to claim 9, further comprising an output gear coupled to said carrier of said transmission.

11. The automatic transmission apparatus according to claim 2, wherein
said transmission comprises:
a first planetary gear train having a first sun gear coupled to said stator through said one-way clutch, a first planetary gear meshing with said first sun gear, a first carrier carrying said first planetary gear, and a first ring gear meshing with said first planetary gear,
a second planetary gear train having a second sun gear coupled to said carrier of said torque converter, a second planetary gear meshing with said second sun gear, a second carrier carrying said second planetary gear and coupled to said first ring gear, and a second ring gear meshing with said second planetary gear and coupled to said first carrier,
a clutch device for selectively connecting and disconnecting said carrier of said torque converter with respect to said first sun gear,
a first brake device for braking rotation of said first sun gear,
a second brake device for braking rotation of said carrier of said torque convertor and said second sun gear, and
a third brake device for braking rotation of said first carrier and said second ring gear.

12. The automatic transmission apparatus according to claim 11, further comprising an output gear coupled to said second carrier of said transmission.

13. The automatic transmission apparatus according to claim 1, wherein said transmission supplies the power from said turbine and said stator at all the forward and reverse speeds of said transmission.

14. The automatic transmission apparatus according to claim 13, wherein
said transmission comprises:
a first input shaft coupled to said carrier of said torque converter,
a second input shaft coupled to said stator through said one-way clutch,
an input gear arranged at an end of said second input shaft,
a first counter gear meshing with said input gear,
a second counter gear meshing with said first counter gear,
a third counter gear for coupling said second counter gear to said first input shaft,
a first counter shaft carrying said first counter gear,
a second counter shaft carrying said second and third counter gears, and
a clutch device for selectively connecting and disconnecting said first input shaft with respect to said first and second counter shafts.

15. The automatic transmission apparatus according to claim 13, wherein
said transmission includes:
a first input shaft coupled to said carrier of said torque converter,
a second input shaft coupled to said stator through said one-way clutch,
a first bevel gear fixed at an end of said first input shaft,
a second bevel gear fixed at an end of said second input shaft and opposed to said first bevel gear,
third and fourth bevel gears opposed to each other and meshing with said first and second bevel gears, respectively,
a differential mechanism having a wheel drive shaft, and
a clutch mechanism for selectively coupling outputs of said third and fourth bevel gears to said differential mechanism.

* * * * *